United States Patent [19]
Moon et al.

[11] Patent Number: 5,587,804
[45] Date of Patent: Dec. 24, 1996

[54] REPRODUCTION ERROR CORRECTION CIRCUIT FOR A VIDEO REPRODUCTION SYSTEM & THE METHOD FOR OPERATING IT

[75] Inventors: Byung-Joon Moon, Kyungki-do; Sung-il Cho, Incheon; Ki-ho Shin, Kyungki-do, all of Rep. of Korea

[73] Assignee: Samsung Electronics Co., Ltd., Suwon, Rep. of Korea

[21] Appl. No.: 280,770

[22] Filed: Jul. 26, 1994

[30] Foreign Application Priority Data

Jul. 28, 1993 [KR] Rep. of Korea ............... 1993-14473

[51] Int. Cl.[6] .................... H04N 9/89; H04N 5/95; H04N 5/78; H04N 9/88
[52] U.S. Cl. ................ 386/2; 386/20; 386/47; 386/90
[58] Field of Search .................... 358/335, 314, 358/320, 336, 310, 339; 360/36.1, 36.2, 38.1; H04N 5/76, 5/78, 5/92, 5/95, 9/89, 9/88

[56] References Cited

U.S. PATENT DOCUMENTS 3,631,429 12/1971 King ........................... 340/174.1
4,287,529 9/1981 Tatami et al. ................... 358/8
5,233,437 8/1993 Tachibana et al. ............... 358/336
5,285,288 2/1994 Takahashi et al. .............. 358/320

Primary Examiner—Thai Q. Tran
Assistant Examiner—David R. Vincent
Attorney, Agent, or Firm—Allen LeRoy Limberg

[57] ABSTRACT

A reproduction error correction circuit for a video reproduction system includes a line-storage memory for temporarily storing composite video signal samples, which memory is operated to provide both for time-base correction and for drop-out compensation. The memory is cyclically supplied sequential write addresses descriptive of pixel locations along a horizontal scan line, generated at a rate that tracks any jitter in the input video signal selectively used for writing over the previous contents of the memory. The memory is cyclically supplied sequential read addresses offset ½ scan line from the write addresses, generated at a stable rate equal to an average over several scan lines of the rate at which write addresses are generated. This provides for time-base error correction. When a drop-out is detected, overwriting of video signal samples already stored in the single line-storage memory is prohibited. This type of overwrite protection implements automatic replacement of the video signal during periods when drop-out is detected. The phase of the chrominance signal component of the delayed video used for drop-out compensation is adjusted, however, when necessary, to correspond to that required in the replacement signal.

10 Claims, 5 Drawing Sheets x ; PHASE INVERTED x ; PHASE INVERTED x ; PHASE INVERTED
o ; PHASE MAINTAINED

REPRODUCTION ERROR CORRECTION CIRCUIT FOR A VIDEO REPRODUCTION SYSTEM & THE METHOD FOR OPERATING IT

BACKGROUND OF THE INVENTION

The present invention relates to a video reproduction system, and more particularly, to a reproduction error correction circuit for a video reproduction system and the method therefor.

FIG. 1 is a block diagram of the reproduction error correction circuit for a conventional video reproduction system. In FIG. 1 the reproduction error correction circuit comprises a time base error correction unit 10 composed of an analog-to-digital (A/D) converter 100 and a first-in-first-out (FIFO) memory 101, and a drop-out compensation unit 20 composed of a one horizontal line (1H) delay 102 and a chromatic signal phase corrector 103.

The horizontal synchronization signal of an input video signal, or a clock signal phase-synchronized with a color burst signal, is applied both as a sampling clock input to the A/D converter 100 and a write clock (WCK) input to the FIFO memory 101 for time base correction. A read clock input (RCK) is applied to the FIFO memory 101, which read clock input (RCK) usually is supplied from a crystal oscillator. Minor time base errors are removed by writing into the FIFO memory 101 with the sampling clock signal being phase-synchronized with the input video signal and by reading with the read clock which has a very stable frequency. The average rate of the write clock (WCK) input taken over several scan lines is controlled to be the stone as the average rate of the read clock input (RCK) over the same time period; in video tape machines this is customarily arranged for by controlling the speed of a capstan regulating the spooling of video tape between pay-out and take-up reels.

When a drop-out is generated, the drop-out correction unit 20 basically compensates the drop-out by replacing the present signal with signal from the immediately preceding scan line. Therefore, a delay circuit 102 is required for delaying the present signal by one horizontal scanning period, or providing 1H delay, so the present signal is available to compensate for drop-out occurring during the next scan line. Commonly, this delay circuit 102 is provided by a further line-storage memory, in addition to the line-storage memory used for time-base correction. In other words, the reproduction error correction circuit for a conventional video reproduction system uses both a FIFO memory and a 1H delay line, each of which takes up considerable area on an integrated-circuit die and consumes an appreciable amount of electrical power. The consumption of electrical power increases the amount of heat that must be dissipated from the integrated circuit in order not to overheat its components.

SUMMARY OF THE INVENTION

The invention in an important one of its aspects is directed to a reproduction error correction circuit for a video reproduction system in which the FIFO memory and a 1H delay line that are separate elements in prior art apparatus are replaced by a single line-storage memory operated to provide both for time-base correction and for drop-out compensation. This has the advantages of reducing the area the reproduction error correction circuit takes up on an integrated-circuit die and reducing the consumption of electrical power by the reproduction error correction circuit. The single line-storage memory is cyclically supplied sequential write addresses descriptive of picture element (pixel) locations along a horizontal scan line, which write addresses are supplied at a rate that tracks any jitter in the input video signal selectively used for writing over the previous contents of the memory. The single line-storage memory is cyclically supplied sequential read addresses descriptive of picture element (pixel) locations along a horizontal scan line that are offset by about one-half scan line from the locations specified by the write addresses, the read addresses being supplied at a stable rate equal to an average over several scan lines of the rate at which write addresses are supplied. This provides for time-base error correction. When a drop-out is detected, overwriting of video signal samples already stored in the single line-storage memory is prohibited. This type of overwrite protection implements automatic replacement of the video signal during periods when drop-out is detected. The replacement video signal is generated from corresponding video signal in the 1H interval before the drop-out initially occurs. In the case of NTSC composite video signals, the luminance portion of the replacement signal is the same as the luminance portion of that corresponding video signal; the phase of the chrominance subcarrier of that corresponding video signal is reversed in the replacement signal when replacing a current video signal that is an odd number of lines more recent than that corresponding video signal; and the phase of the chrominance subcarrier of that corresponding video signal is retained in the replacement signal when replacing current video an even number of lines more recent than that corresponding video signal.

In preferred embodiments of the invention, the number of scan lines back from which the replacement signal is taken is determined from a modular count of the number of scan line periods a drop-out has persisted. This avoids having to append a modular line count to the video samples stored in the single line-storage memory, in order to specify the phase of the chrominance signal component of those samples as referenced to scan line beginning.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Reproduction error circuitry for an image reproduction system, which circuitry embodies the present invention, will be described, following, with reference to FIGS. 2–7 of the accompanying drawings.

Figure 1:
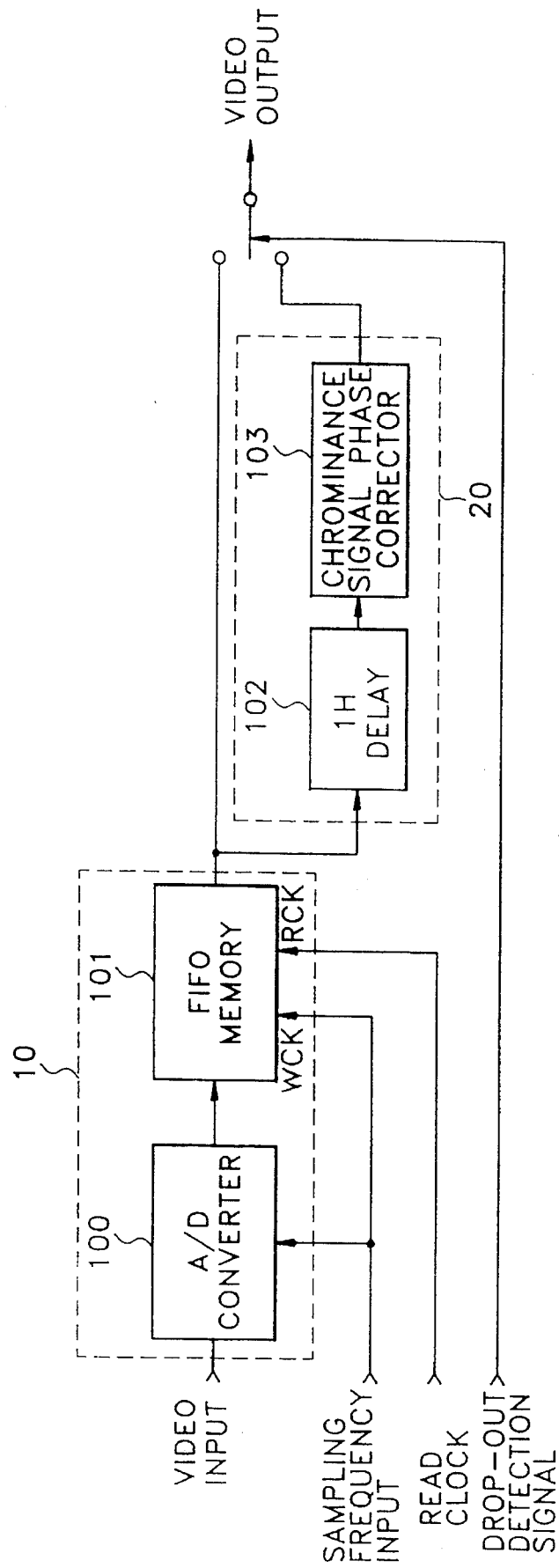
FIG. 1 is a block diagram of the reproduction error correction circuit for a prior-art image reproduction system.
Figure 2:
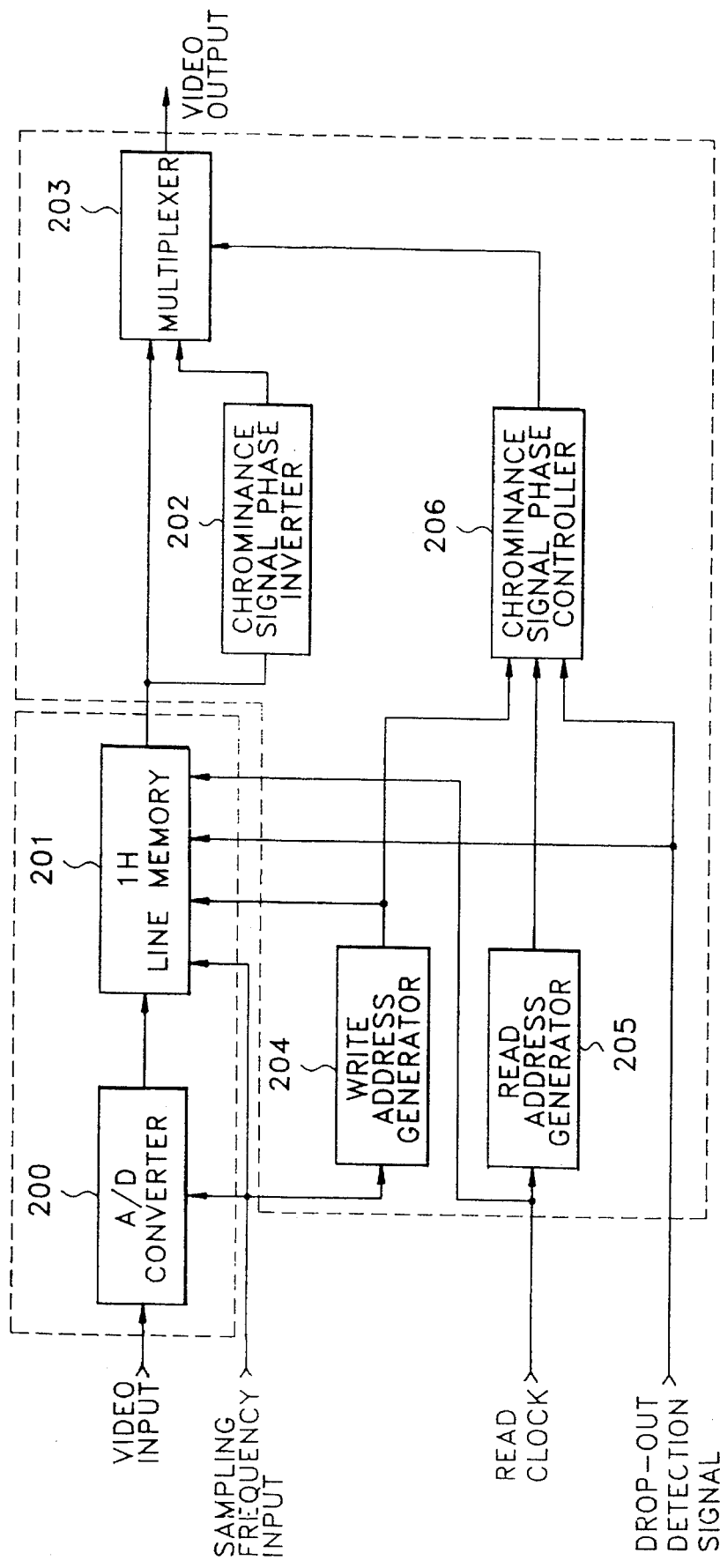
FIG. 2 is a block diagram of the reproduction error correction circuit for the image reproduction system according to the present invention.

In FIG. 2, the reproduction error correction circuit includes a time base error correcting unit 30 and a drop-out compensating unit 40. The time base error correcting unit 30 comprises an analog-to-digital converter 200 and a 1H line memory 201. The drop-out compensating unit 40 comprises a chrominance signal phase inverter 202, a multiplexer 203, a write address generator 204, a read address generator 205, and a chrominance signal phase controller 206.

The sampling frequency input is supplied to the analog-to-digital converter 200 as a sampling clock and to the 1H line memory 201 as a write clock. This sampling frequency input closely tracks any jitter in the input video signal, having been phase-synchronized to the horizontal synchronization signal or the color burst signal component of the input video signal. The read clock for the memory has a constant frequency and is usually generated from a crystal oscillator, per conventional practice for time-base-error correction circuitry. The error with respect to time base is corrected by reading with the stable read clock while writing into the 1H line memory 201 in accordance with the sampling frequency input that closely tracks the jitter of the input video signal. Within the 1H line memory 201 the reading of storage locations is arranged to take place with an offset from their being written, which offset averages about one-half scan line. In this embodiment, the input video signal represents an NTSC composite video signal.

When drop-out occurs, a drop-out detection signal indicating the occurrence of the drop-out is input to the 1H line memory 201 and to the chrominance signal phase controller 206. This drop-out detection signal can be developed by an a drop-out detector responding to the disappearance of a modulated carrier which is detected to recover the video input signal; in an analog video tape recorder the amplitude of a carrier frequency-modulated by the luminance signal portion of the video signal can be sensed by a drop-out detector, by way of example. In a digital video recorder the drop-out detection signal can be developed by an a drop-out detector responding to the disappearance of normal digital coding conditions, by way of counter-example.

In the FIG. 2 reproduction error correction circuit the drop-out detection signal functions as an overwrite-protection signal in the 1H line memory 201. That is to say, when a drop-out occurs, causing the drop-out detection signal to be generated, overwrite protection is provided for the write address range of the 1H line memory 201 that corresponds to the segment of scan during which the drop-out detection signal is generated. If the 1H line memory 201 is of a type requiring a write enabling signal, the write enabling signal required for writing over of the previous contents stored in the 1H line memory 201 is withheld, in order to provide the overwrite protection that preserves the video signal samples written in an earlier scan line. The data in the address range provided the overwrite protection are preserved, even though write addresses continue to be sequentially generated within the 1H line memory 201. The address offsets of the read address and write address maintain a scanning period of about 1H/2 on the average, 1H/2 being a time period one-half as long as the time 1H for scanning a horizontal line. However, the address offsets vary continually, depending on the jitter of the input video signal. During the time overwrite is prohibited in response to the drop-out detection signal, when the read address following with about 1H/2 address offset accesses the write-protected address range, the video signal samples written into the 1H line memory 201 during a previous scan line and preserved by overwrite protection are read from the 1H line memory 201. So, the segment of the screen where the drop-out would otherwise be evident is provided with video signal from a horizontal scanning line previous to the current one, automatically providing drop-out compensation. However, standard practice is that the phase of the color subcarrier for chrominance modulation changes from line to line, as referred to the beginning of each scan line. In the case of an NTSC signal, since there is an odd number of half cycles of chroma subcarrier in each 1H period, the spatial phase of the color subcarrier is offset 180° for each successive line. Accordingly, when composite video signal from an earlier scanning line substituted for composite video signal from a later scanning line, correction of color subcarrier phasing for the chrominance signal is often necessary, at least for a portion or portions of the drop-out generation period.

Figure 3A:
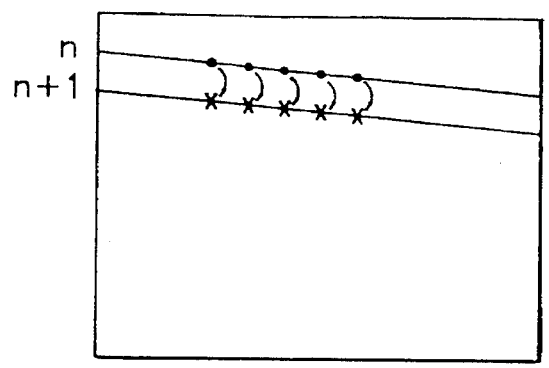
FIGS. 3A, 3B and 3C illustrate phase correction of the chrominance subcarrier by the reproduction error correction circuit according to the present invention.
Figure 3B:
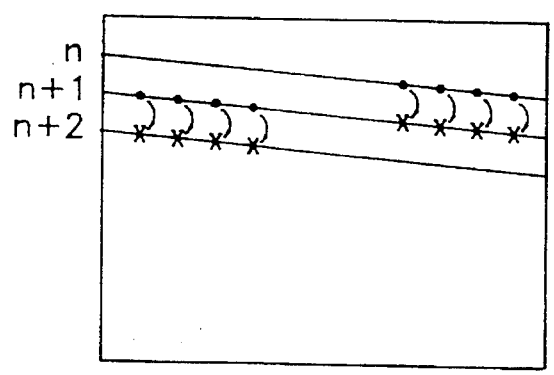
Figure 3C:
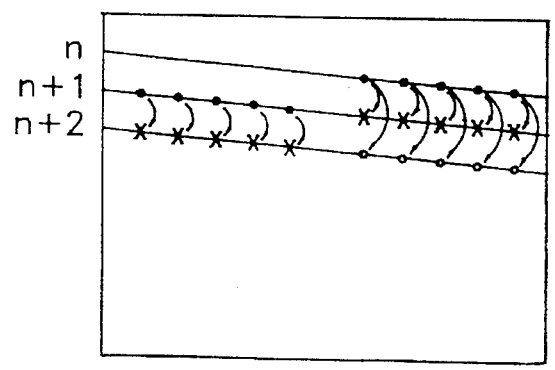

FIGS. 3A, 3B and 3C illustrate phase correction of the color, or chrominance, subcarrier. FIG. 3A illustrates phase correction when a drop-out is generated within a horizontal scanning line n+1. FIG. 3B illustrates phase correction when a drop-out in consecutive horizontal scanning lines n+1 and n+2 is shorter than 1H, the duration of a horizontal scanning line, so drop-out compensating signal can be extracted from the scanning lines n and n+1 at times one scan line period earlier than those times during which drop-out occurs. FIG. 3C illustrates phase correction in the case where a drop-out in consecutive horizontal scanning lines n+1 and n+2 is longer than the duration of one horizontal scanning line, requiring the drop-out compensating signal to be extracted from a scanning line two previous to one in which drop-out occurs, after the duration of the drop-out exceeds the duration of one entire horizontal scanning line.

FIGS. 3A and 3B illustrate conditions in which drop-outs have respective durations each no longer than the duration of a single horizontal scanning line. To compensate for the drop-outs, the video signal of a current scanning line is replaced with the previous scanning line, but with the phase of the chrominance subcarrier of the previous o scanning line being inverted in the replacement signal. FIG. 3C illustrates conditions in which the duration of the drop-out is longer period than the duration of a single horizontal scan line. In such case, from the initial point of the drop-out until a point one horizontal scanning period later, current video signal is replaced with video signal from one horizontal scanning line time earlier, with the phase of the color subcarrier of the earlier video signal being inverted in the replacement signal. One horizontal scanning period after the initial point of the drop-out, the current video signal perforce is replaced in part with video signal from two horizontal scanning lines earlier, the original phase of the color subcarrier being retained in this portion of the replacement signal. More generally, during drop-out periods, the video signal is replaced with corresponding video signal in the 1H interval before the drop-out initially occurs, the phase of the chrominance subcarrier of that corresponding video signal being reversed when it replaces current video an odd number of lines more recent (e.g., one line newer) and the phase of the chrominance subcarrier of that corresponding video signal being retained when it replaces current video an even number of lines more recent (e.g., two lines newer).

In FIG. 2 the chrominance signal phase inverter 202 responds to delayed video signal from the 1H line memory 201 with a response to the delayed video signal in which the phase of the chrominance subcarrier is inverted. The selection of either phase inversion or phase retention is performed by the multiplexer 203 and the control signal for such selection is generated from the chrominance signal phase controller 206. The chrominance signal phase controller 206 controls the phase of the color subcarrier such that color reproduction is properly performed with respect to the cases shown in FIGS. 3A, 3B and 3C. For this purpose, the chrominance signal phase controller 206 receives a write address, a read address and a drop-out detection signal.

The basic principle of the chrominance signal phase controller 206 will now be explained. First, the write address of the starting and finishing points of a drop-out interval is stored in an internal register of the chrominance signal phase controller 206. Then, when the read address following with the period of about 1H/2 matches the write address of the drop-out starting point, the output signal of the chrominance signal phase controller 206 is forced to be "high" level, conditioning the multiplexer 203 to select as a video output signal therefrom video signal supplied from the chrominance signal phase inverter 202, in which video signal the color subcarrier has been phase-inverted. Thereafter, when the read addresses are continuously counted to match the write address of the drop-out finishing point, the output signal of the chrominance signal phase controller 206 is forced to be "low" level, conditioning the multiplexer 203 to select as a video output signal therefrom video signal supplied directly from the 1H line memory 201, in which video signal the color subcarrier retains the original phase of the delayed video signal from the 1H line memory 201.

When the drop-out extends for a duration longer than one 1H time period, the output signal of the chrominance signal phase controller 206 inverts logic state every 1H time period following initial drop-out, and returns to a logic "low" when the read address matches the write address of the drop-out finishing point, if not already at the logic "low" when the read address matches the write address of the drop-out finishing point.

Figure 4:
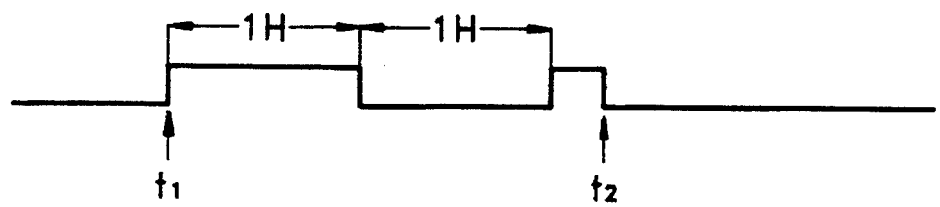
FIG. 4 is a waveform diagram of the output signal of the chrominance signal phase controlling means according to the present invention.

FIG. 4 shows an exemplary case wherein the drop-out period persists for more than 2H scanning periods but less than 3H scanning periods and illustrates a waveform diagram of the output signal of the chrominance signal phase controller 206. In FIG. 4, the point marked "$t_1$" represents the point when the read address matches the write address of the drop-out starting point, and the point marked "$t_2$" represents the point when the read address matches the write address of the drop-out finishing point.

Figure 5:
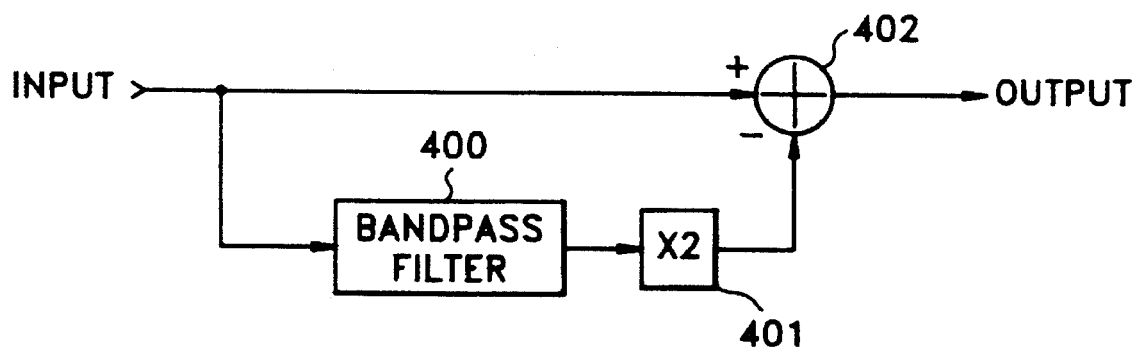
FIG. 5 is a block diagram of the chrominance signal phase inverting means for the reproduction error correction circuit according to an embodiment of the present invention.

FIG. 5 is a block diagram of a representative embodiment of the chrominance signal phase inverter 202, which comprises a bandpass filter 400, a multiplier 401 and a subtracter 402. The block diagram is somewhat simplified for purposes of explanation. As one familiar with the art of filter design will discern, the bandpass filter 400, which is generally a linear-phase finite-impulse-response (FIR) digital filter, in actual practice exhibits a transfer delay or latency in its response, which is applied to the subtrahend input of the subtracter 402 after its amplitude is doubled by the multiplier 401. In actual practice this delay should be compensated for by introducing similar delay into the input signal applied to the minuend input of the subtracter 402. The means for introducing this similar delay into the input signal applied to the minuend input of the subtracter 402 is not explicitly shown in FIG. 5, but is customarily provided for by a tapped delay line included as a component of the bandpass filter 400, when realized as an FIR digital filter.

Figure 6A:
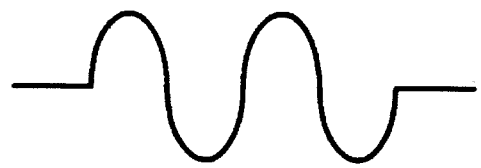
FIGS. 6A, 6B and 6C are waveform diagrams of various parts of the chrominance signal phase inverting means according to the present invention.
Figure 6B:
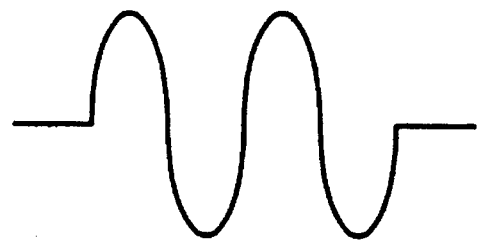
Figure 6C:
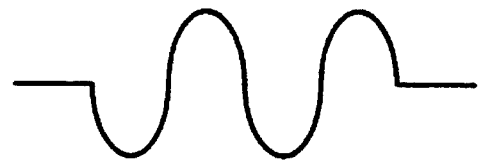

FIGS. 6A, 6B and 6C will also be referred to in the following description of the operation of the FIG. 5 chrominance signal phase inverter. A composite video signal supplied to the minuend input of the subtracter 402 includes a chrominance signal component, the waveform of which is shown in FIG. 6A, which chrominance signal component is filtered from the composite video signal by the bandpass filter 400. An unchanging chrominance signal that corresponds to color subcarrier in phase is presumed for purposes of explanation. (One could alternatively consider FIGS. 6A–6C to show portions of the color burst interval.) The bandpass filter 400 response of FIG. 6A is doubled in amplitude by the multiplier 401, which outputs a signal the waveform of which is shown in FIG. 6B. The multiplier 401 can simply consist of a wired one-bit shift towards greater significance. The signal of FIG. 6B is subtracted from the signal of FIG. 6A by the subtracter 402, which outputs a composite video signal including a chrominance signal component. The waveform of this chrominance signal component, or corrected-chrominance-phase signal, is shown in FIG. 6C. In this manner, the phase of the color subcarrier of 10 the chrominance signal component is inverted. One skilled in the art and provided the foregoing explanation will understand that the inversion of color subcarrier phase obtains, no matter what the instantaneous phase and amplitude variations of the chrominance signal component are.

Figure 7:
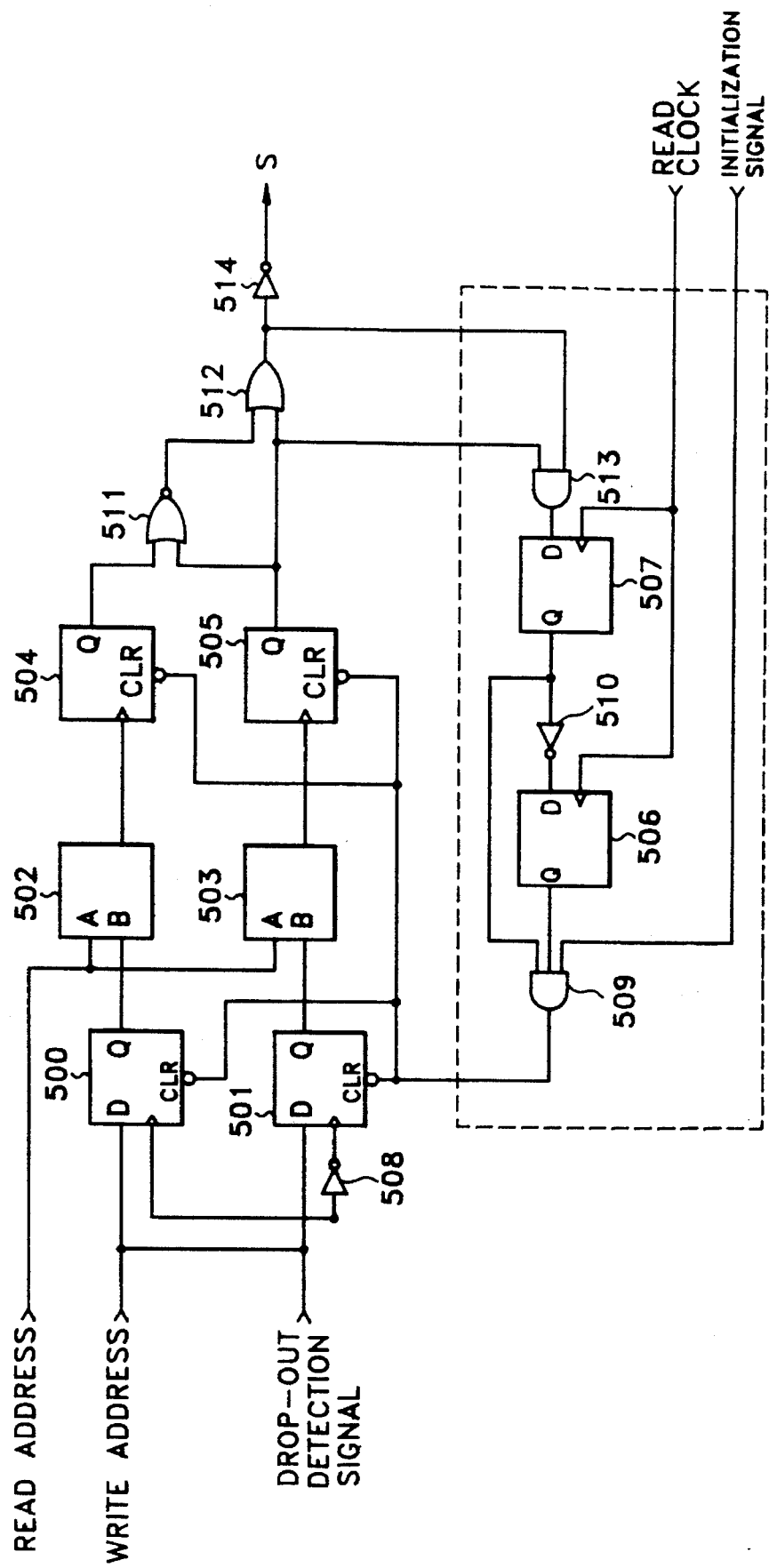
FIG. 7 is a circuit diagram of the chrominance signal phase controlling means according to an embodiment of the present invention.

FIG. 7 is a circuit diagram of the chrominance signal phase controller for a video reproduction system. In FIG. 7, the chrominance signal phase controller 206 comprises flip-flops 500, 501, 504, 505, 506 and 507, comparators 502 and 503, logic inverters 508, 510 and 514, AND gates 509 and 513, a NOR gate 511, and an OR gate 512. The flip-flops 500 and 501 are data or D flip-flops each representative of a respective bank of such flip-flops; the flip-flops 504 and 505 are triggered or T flip-flops; and the flip-flops 506 and 507 are data or D flip-flops used as respective bit latches. In certain of the claims that follow this specification, the flip-flops 504 and 505 are referred to as first toggling means and second toggling means, respectively; and the NOR gate 511, the OR gate 512, and the logic inverter 514 are referred to as gating means for performing an AND operation on the Q output signal of said first toggling means and the logic complement of the Q output signal of said second toggling means.

An initialization signal is generated once in the initial state of the system operation. While the initialization signal is "low," outputs of the flip-flops 500 and 501 are all "high" and those of the flip-flops 504 and 505 are cleared and go "low," thereby initializing the circuit. Here, although as many D flip-flops as write address bits are connected in parallel, only single D flip-flops 500 are 501 are shown in FIG. 7. In order to prevent the outputs of the comparators 502 and 503 from being generated in the blocks where the drop-out detection signal is not generated, the outputs of flip-flops 500 and 501 are set as values beyond the memory address. For example, when analog and digital sampling frequency is set as $4f_{sc}$ by the time base error corrector, where $f_{sc}$ the frequency of the color carrier, the number of samples for a 1H scanning period is 910 and thus the address range is 0 to 909. At this time, in order for the flip-flops 500 and 501 to latch each address value 0–909, the flip-flops 500 and 501 should each be 10-bit flip-flops. If the ten bits are all set, with an address value of 1023, which is beyond the address range, the comparison result of the comparators 502 and 503 is not generated unless a drop-out detection signal is input. Therefore, the output of the flip-flops 504 and 505 maintain the initial, cleared state, the output of the chrominance signal phase controller 206 stays "low," and the video signal which does not have its chrominance signal inverted in phase is selected as video output signal by the multiplexer 203 shown in FIG. 2.

The positive-going edge of the drop-out detection signal represents a drop-out starting point and the negative-going edge thereof represents a drop-out finishing point. The write address of the drop-out starting point is latched to the flip-flop 500 at the positive-going edge, and the write address of the drop-out finishing point is latched to the flip-flop 501 at the negative-going edge. When the drop-out detection signal is generated, the chrominance signal phase controller 206 operates as follows. The read address following the write address with about 1H/2 address offset is first compared with the write address of the drop-out starting point which is stored in the flip-flop 500 until the read address matches the write address, so that a "high" is output from the comparator 502. Then, the output of the comparator 502 functions as the clock of flip-flop 504, to change 504 output from "low" to "high", which conditions the output signal of the NOR gate 511 to go "low". At this time, the output of the flip-flop 505 still maintains a logic "low" level. The OR gate 511 responds with a logic "low" to the logic "low" levels it receives from the NOR gate 511 and the flip-flop 505, thereby conditioning the logic inverter 514 to supply an output signal S from the chrominance signal phase controller 206, which output signal is a logic "high" level that conditions the chrominance signal phase inverter 202 to invert the chrominance signal phase.

Thereafter, if the drop-out period finishes within a 1H scanning period, at the time when the read address matches the write address of the drop-out finishing point, the output of the flip-flop 505 is toggled from "low" to "high", to which the OR gate 511 responds with a logic "high" that conditions the logic inverter 514 to supply an output signal S that is at a logic "low" level. This causes the chrominance signal phase inverter 202 no longer to invert the chrominance signal phase.

Alternatively, if the drop-out period extends longer than a 1H scanning period, whenever the read address matches the write address of the drop-out starting point, the output of the T flip-flop 504 changes logic condition responsive to a trigger signal supplied by the comparator 502. This change in the logic state of the flip-flop 504 while the output of the flip-flop 505 remains "low" causes change in the logic state of the NOR gate 511 response, in turn causing change in the logic state of the OR gate 512 response. The changing logic states of the OR gate 512 response appear in complemented form in the output signal S supplied from the logic inverter 514. Thereafter, when the write address of the drop-out finishing point matches the read address, the output of the flip-flop 505 is toggled from "low" to "high", thence to return the output signal S to a logic "high" level, irrespective of the output state of the flip-flop 504, and thereby terminate one cycle of the drop-out compensation.

The reset signal generator enclosed within dashed line in FIG. 7 is a circuit for generating a reset signal that resets the outputs of the flip-flops 500 and 501 to out-of-range addresses at termination of a drop-out compensation, that is, at the time when the read address matches the write address of the drop-out finishing point, and clears the flip-flops 504 and 505. The reset signal generator generates a reset pulse having a logic "low" block of one cycle of the read address clock signal as the output of the AND gate 509, by detecting the positive-going edge when the output of the flip-flop 505 is toggled from "low" to "high". This positive-going edge is detected by a positive edge detector comprising an inverter 510, a flip-flop 507 and an AND gate 513. The AND gate 513 is connected to respond to the output of the flip-flop 505 changing from "low" to "high," to force the outputs of the flip-flops 500 and 501 to "high" levels and to force the outputs of the flip-flops 504 and 505 to "low" levels, thereby returning the chrominance signal phase controller 206 to the initial state.

An important thing to understand about the FIG. 7 chrominance signal phase controller is that it is a modulo-two counter counting at scan line rate, the scan line count being reset to one at the starting point of the drop-out detection signal. This counter keeps track of from how many lines back the video signal samples used for generating the replacement signal are taken. This avoids any need for storing scan line number information with the temporarily video signal samples in order to determine how many lines back preserved video signal samples originated, which helps keep down the number of bits that have to be stored by the 1H line memory 201. The counting of lines is done using modulo-two numbers because two alternative color subcarrier phasings as referenced to beginning of scan line cyclically occur in successive horizontal scan invention in which a greater number of color subcarrier phasings as referenced to beginning of scan line cyclically occur in successive horizontal scan lines (e.g., four phasings of color-under signal in analog video tape recording), the modular counting of scan lines is done using that greater number as the modulus.

One skilled in the art will by acquaintance with the foregoing specification and accompanying drawing be empowered to design other embodiments of the invention; this should be taken into account when considering the scope of the claims appended to this specification. For example, the chrominance signal phase inverter 202 can be replaced by circuitry that separates the luminance and chrominance components of the video signal supplied from the 1H line memory 201, selectively inverts the separated chrominance component under the control of the chrominance signal phase controller 206, and combines the selectively inverted separated chrominance component with the separated luminance signal component to generate the video output signal. Embodiments of the invention suitable for use with composite video signals with modifications suiting those embodiments for use

What is claimed is:

1. A reproduction error correction circuit a video reproduction system comprising:

storage means for storing image data of one horizontal scanning period by receiving an image digitized in response to a write clock signal;

write address generating means for sequentially generating write addresses for said storage means in response to said write clock signal;

read address generating means for sequentially generating read addresses for said storage means in response to a read clock signal;

a chrominance signal phase controlling means for controlling the phase of a chrominance signal by receiving a drop-out detecting signal, said read address signal and said write address signal;

a chrominance signal phase inverting means for inverting the phase of the chrominance signal by receiving the output signal of said storage means; and selecting means for outputting the output signal of said storage means or outputting the output signal of said chrominance signal phase inverting means in response to the output signal of said chrominance signal phase controlling means.

2. A reproduction error correction circuit for a video reproduction system comprising:

storage means for storing image data of one horizontal scanning period by receiving an image digitized in response to a write clock signal:

write address generating means for sequentially generating write addresses for said storage means in response to said write clock signal;

read address generating means for sequentially generating read addresses for said storage means in response a read clock signal;

a chrominance signal phase controlling means for controlling the phase of a chrominance signal by receiving a drop-out detecting signal said, read address signal and said write address signal;

a chrominance signal phase inverting means for inverting the phase of the chrominance signal by receiving the output signal of said storage means; and selecting means for outputting the output signal of said storage means or outputting the output signal of said chrominance signal phase inverting means in response to the output signal of said chrominance signal phase controlling means, wherein said chrominance signal phase controlling means comprises:

first write address storage means for temporarily storing the write address corresponding to a starting point of said drop-out detection signal;

second write address storage means for storing the write address signal corresponding to a finishing point said drop-out detection signal;

first comparing means for comparing the read address signal with the write address signal temporarily stored in said first write address storage means and generating a respective output indication of when the read address signal is the same as the write address signal temporarily stored in said first write address storage means;

second comparing means for comparing the read address signal with the write address signal temporarily stored in said second write address storage means and generating a respective output indication of when the read address signal is the same as the write address signal temporarily stored in said secondt write address storage means;

first toggling means for toggling in response to each output indication from said first comparing means;

second toggling means for toggling in response to each output indication from said second comparing means;

gating means for receiving the output signal of said first toggling means and the output signal of said second toggling means and performing an AND operation on the output signal of said first toggling means and the logic complement of the output signal of said second toggling means; and reset signal generating means for generating a reset signal when said read address matches the write address of a drop-out finishing point, which said reset signal resets said first and second write address storage means to write addresses outside the range of write addresses for said storage means, and which said reset signal clears said first and second toggling means.

3. A reproduction error correction circuit for a video reproduction system as claimed in claim 2, wherein said reset signal generating means comprises:

AND operating means for receiving the output signal of said second toggling means and the inverted signal of said gating means mad performing an AND operation thereon;

a first bit latch for temporarily storing the output signal of said AND operating means in response to said read clock signal and outputting the same;

a second bit latch for temporarily storing the inverted output signal of said first bit latch in response to said read clock signal and outputting the same; and AND operating means for receiving the output signals of said first and second bit latches and an initialization signal and performing an AND operation thereon thus to generate said reset signal.

4. A reproduction error correction circuit for a video reproduction system; which system includes a write clock signal generator for generating a write clock signal that tracks any jitter in an input video signal, a read clock generator for generating a stable read clock signal, and a drop-out detector for generating a drop-out detection signal whenever drop-out occurs in said input video signal; said reproduction error correction circuit for generating a time-base-corrected output video signal, which said output video signal is responsive to said input video signal except whenever a drop-out detection signal occurs and is then provided drop-out compensation; said reproduction error correction circuit comprising;

memory for storing image data of one horizontal scanning period, provided with an input port receiving said input video signal as digitized in response to said write clock signal, and provided with an output port;

a write address generator for generating in a prescribed sequence, write addresses for said memory at a rate responsive to said write clock signal;

a read address generator for generating in said prescribed sequence, read addresses for said memory at a rate responsive to said read clock signal, said read addresses corresponding to write addresses generated a portion of a line scanning period earlier;

circuitry for separating the chrominance portion of video signal read from said memory via its output port;

circuitry for selectively changing, between first and second color subcarrier phases, the phase of the chrominance portion of the video signal read from said memory via its output port, thereby to generate a corrected-chrominance-phase signal;

circuitry for combining said corrected-chrominance-phase signal with the luminance portion of the video signal read from said memory via its output port, thereby to generate said time-base-corrected output video signal; and a chrominance signal phase controlling for controlling the selection of the phase of said corrected-chrominance-phase signal response to said drop-out detecting signal, said read address signal and said write address signal, wherein said chrominance signal phase controller comprises:

a first write address latching circuit for temporarily storing the write address corresponding to the start of said drop-out detection signal;

a second write address latching circuit for temporarily storing the write address signal corresponding to the finish of said drop-out detection signal;

a first digital comparator for comparing the read address signal with the write address signal temporarily stored in said first write address latching circuit;

a second digital comparator for comparing the read address signal with the write address signal temporarily stored in said second write address latching circuit;

a first toggling circuit, connected for being toggled in response to the output signal of said first digital comparator indicating that the read address signal is equal to the write address signal temporarily stored in said first write address latching circuit;

a second toggling circuit, connected for being toggled in response to the output signal of said second digital comparator indicating that the read address signal is equal to the write address signal temporarily stored in said second write address latching circuit;

gating circuitry for receiving the output signal of said first toggling circuit and the output signal of said second toggling circuit and performing a first AND operation on the output signal of said first toggling circuit and the logic complement of the output signal of said second toggling circuit; and reset signal generating circuitry for generating a reset signal when said read address matches the write address of a drop-out finishing point, which reset signal resets said first and second write address latching circuits to write address values outside the address range of said memory for storing image data of one horizontal scanning period, and clears said first and second toggling circuits.

5. A reproduction error correction circuit for a video reproduction system as claimed in claim 4, wherein said gating circuitry comprises:

a NOR gate generating a NOR logic response to the output signals of said first and second toggling circuits;

an OR gate generating an OR logic response to said NOR logic response and the output signal of said second toggling circuit; and a logic inverter complementing said OR logic response to complete said first AND operation.

6. A reproduction error correction circuit for a video reproduction system as claimed in claim 5, wherein said reset signal generating circuitry comprises:

a two-input first AND gate, being connected for receiving the output signal of said second toggling means and the OR logic response of said OR gate, and performing a second AND operation thereon;

a first bit latch responding to said read clock signal for temporarily storing the output signal of said two-input first AND gate and outputting the same;

a second bit latch responding to said read clock signal for temporarily storing a logic complement of the output signal of said first bit latch and outputting the same; and a three-input second AND gate, being connected for receiving an initialization signal and the output signals of said first and second bit latches, and performing a third AND operation thereon thus to generate said reset signal.

7. A reproduction error correction circuit for a video reproduction system as claimed in claim 4, wherein said reset signal generating circuitry comprises:

a two-input first AND gate, being connected for receiving the output signal of said second toggling means and the OR logic response of said OR gate, and performing a second AND operation thereon;

a first bit latch responding to said read clock signal for temporarily storing the output signal of said two-input first AND gate and outputting the same;

a second bit latch responding to said read clock signal for temporarily storing a logic complement of the output signal of said first bit latch and outputting the same; and a three-input second AND gate, being connected for receiving an initialization signal and the output signals of said first and second bit latches, and performing a third AND operation thereon thus to generate said reset signal.

8. A reproduction error correction method for a video reproduction system using a composite video signal comprising luminance and chrominance signal components, said chrominance signal component being formed by the modulation of a color subcarrier which is apt to be suppressed, said method comprising the steps of:

temporarily preserving previous video signal portions from scanning lines previous to a current horizontal scanning line, which video signal portions are those most recently received in the absence of drop-out detection signal being generated;

detecting when video signal of a current horizontal scanning line experiences drop-out, for generating a drop-out detection signal;

responsive to said drop-out detection signal replacing video signal, of a current horizontal scanning line with a replacement video signal generated from corresponding video signal, portions of which are preserved from at least one previous horizontal scanning line and are the previous video signal portions most recently received in the absence of drop-out detection signal being generated; and generating said replacement video signal by substeps comprising:

using in said replacement video signal said portions of said previous video signal most recently received in the absence of drop-out detection signal being generated, except for chrominance signal components of said previous video signal taken from an odd number of scan lines back;

inverting the phase of the chrominance signal component of said previous video signal taken from an odd number of scan lines back that accompanied luminance signal component used in said replacement video signal; and using the resulting inverted-phase chrominance signal component in said replacement video signal.

9. A reproduction error correction method for a video reproduction system using a line-storage memory for storing composite video signal comprising luminance and chrominance signal components, said chrominance signal component being formed by the modulation of a color subcarrier which is apt to be suppressed, said method comprising the steps of:

detecting when video signal of a current horizontal scanning line experiences drop-out, for generating a drop-out detection signal;

digitizing the composite video signal at a rate phase-locked to a multiple of frequency of synchronizing information contained within the composite video signal;

generating a sequence of write addresses for the line-storage memory, which write addresses are generated at the same rate as the composite video signal is digitized;

writing the digitized composite video signal into said line-storage memory only when said drop-out detection signal is not generated;

generating a sequence of read addresses for the line-storage memory, which read addresses are generated at a fixed rate the average of which taken over several scan lines is the same as the average of the rate at which write addresses are generated; and generating an output video signal from the composite video signal read from the line-storage memory by substeps comprising:

counting the number of scan line durations modulo-two that said drop-out detection signal is generated;

responsive to the modulo-two count of the number of scan line durations that said drop-out detection signal is generated being zero, generating said output video signal so it has respective luminance and chrominance signal components similar to the composite video signal read from the line-storage memory; and responsive to the modulo-two count of the number of scan line durations that said drop-out detection signal is generated being one, generating said output video signal so it has a luminance signal component similar to the composite video signal read from the line-storage memory and has a chrominance signal component of amplitude similar to that of the chrominance signal component of the composite video signal read from the line-storage memory, but of opposite phasing respective to color burst.

10. A reproduction error correction method for a video reproduction system wherein a video signal of a current horizontal scanning line is replaced with video signal from a horizontal scanning line one previous to the current horizontal scanning line, inverting the phase of the chrominance subcarrier of said horizontal scanning line one previous to the current horizontal scanning line, when a drop-out is generated within one horizontal scanning period; and wherein, when a drop-out is generated within an interval extending more than one horizontal scanning period to another, in the interval from the generation point of the drop-out until the point one horizontal scanning period letter in time, the video signal of a current horizontal scanning line is replaced with the video signal from the horizontal scanning line one previous to the current horizontal scanning line, inverting the phase of the chrominance subcarrier of said horizontal scanning line one previous to the current horizontal scanning line, and, in the interval after the point of one horizontal scanning period later in time than the generation point of the drop-out, the video signal of the next current horizontal scanning line is replaced with the video signal from the horizontal scan line two horizontal scanning lines previous thereto, maintaining the phase of the chrominance subcarrier of the video signal from the horizontal scan line two horizontal scanning lines previous.

* * * * *